United States Patent [19]

Mead et al.

[11] Patent Number: 5,402,166
[45] Date of Patent: Mar. 28, 1995

[54] METHOD AND APPARATUS FOR COMPENSATING FOR FILM REGISTRATION WEAVE IN FILM SCANNING SYSTEMS

[75] Inventors: Terence W. Mead, Hertford; Richard T. Such, Bishops Stortford, both of England

[73] Assignee: Rank Cintel Limited, Hertfordshire, United Kingdom

[21] Appl. No.: 974,979

[22] Filed: Nov. 12, 1992

[30] Foreign Application Priority Data

Nov. 12, 1991 [GB] United Kingdom ............... 9123989

[51] Int. Cl.⁶ ........................................... H04N 5/253
[52] U.S. Cl. ............................... 348/96; 348/97; 348/99; 348/100; 352/244
[58] Field of Search ............... 352/85, 244, 239; 358/214, 216, 215; H04N 5/253, 3/36; 348/96–106

[56] References Cited

U.S. PATENT DOCUMENTS

| | | | |
|---|---|---|---|
| 3,650,448 | 3/1972 | Jarmy . | |
| 3,723,650 | 3/1973 | Bradley et al. | 178/7.2 |
| 4,104,680 | 8/1978 | Holland . | |
| 4,196,450 | 4/1980 | Miller et al. | 358/256 |
| 4,459,677 | 7/1984 | Porter et al. | 364/900 |
| 4,587,633 | 5/1986 | Wang et al. | 364/900 |
| 4,589,020 | 5/1986 | Akatsuka | 358/160 |
| 4,630,120 | 12/1986 | Childs | 358/214 |
| 4,685,140 | 8/1987 | Mount, II | 382/6 |
| 4,714,962 | 12/1987 | Levine | 358/209 |
| 4,724,307 | 2/1988 | Dutton et al. | 235/455 |
| 4,751,583 | 6/1988 | Levine | 358/256 |
| 4,788,658 | 11/1988 | Hanebuth | 364/900 |
| 4,823,204 | 4/1989 | Holland | 358/347 |
| 4,827,347 | 5/1989 | Bell | 358/224 |
| 4,875,102 | 10/1989 | Poetsch | 358/214 |
| 4,894,792 | 1/1990 | Mitchell et al. | 364/708 |
| 4,930,014 | 5/1990 | Maeda et al. | 358/209 |
| 4,937,676 | 6/1990 | Finelli et al. | 358/229 |
| 4,964,066 | 10/1990 | Yamane et al. | 364/518 |
| 4,969,830 | 11/1990 | Daly et al. | 439/136 |
| 5,030,128 | 7/1991 | Herron et al. | 439/372 |
| 5,150,957 | 9/1992 | Walker et al. | 358/347 |
| 5,194,958 | 3/1993 | Pearman et al. | 358/214 |

FOREIGN PATENT DOCUMENTS

| | | | |
|---|---|---|---|
| 869329 | 5/1962 | United Kingdom | G08C 25/00 |
| 1133878 | 11/1968 | United Kingdom | G05D 3/06 |
| 2191608 | 12/1987 | United Kingdom | B65H 23/02 |
| 8801822 | 3/1988 | WIPO | H04N 3/36 |

OTHER PUBLICATIONS

U.S. Patent Application 07/938,573; filed Aug. 31, 1992; entitled "Hand-Manipulated Electronic Camera Tethered to a Personal Computer"; Inventors: John J. Acello, Robert H. Hamel; Kenneth Parulski.

Primary Examiner—Michael T. Razavi
Assistant Examiner—Ngoc-Yen Vu
Attorney, Agent, or Firm—Ostrolenk, Faber, Gerb & Soffen

[57] ABSTRACT

A film instability compensating system compensates for the effects of film instability in a film gate. The film instability compensation system includes a positional transducer for measuring the position of the film edge relative to a sprocket hole which is maintained in contact with a sprocket tooth by a pressure roller. The positional transducer measures the distance between the film edge and a sprocket hole and then measures deviations from the distance for subsequent sprocket holes to determine a compensation signal. The output of the positional transducer is coupled to a delay unit which delays the signal corresponding to the error at a particular sprocket hole until that sprocket hole reaches the film gate. Signals representative of the cyclic errors caused by the relative lateral displacement of the sprocket holes, are stored in a memory and are applied to a subtractor circuit. In the subtractor circuit, the compensation signal from the output of a pipeline register delay is adjusted to compensate for cyclic errors, and to provide an overall compensation signal which is applied to the horizontal scan shift when the appropriate sprocket hole reaches the film gate.

20 Claims, 3 Drawing Sheets

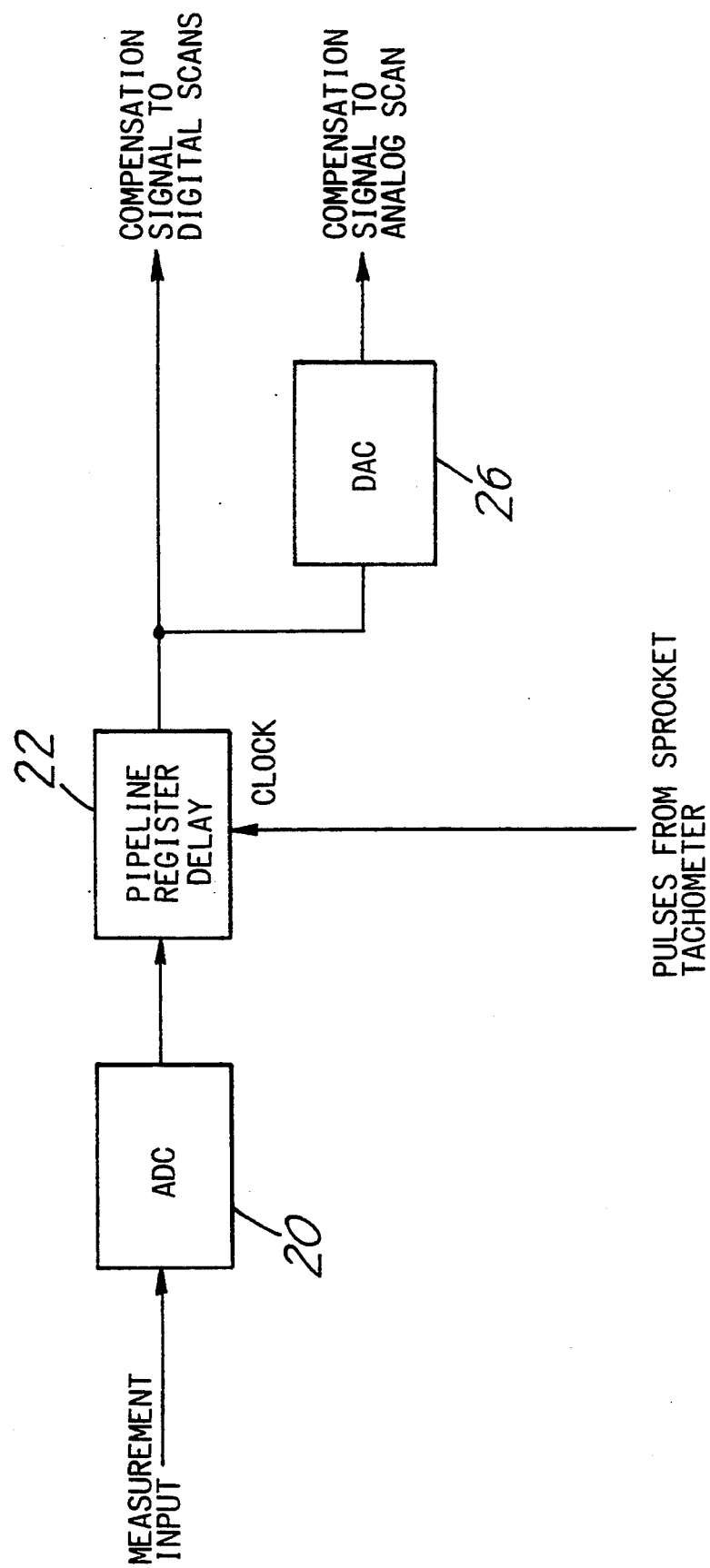

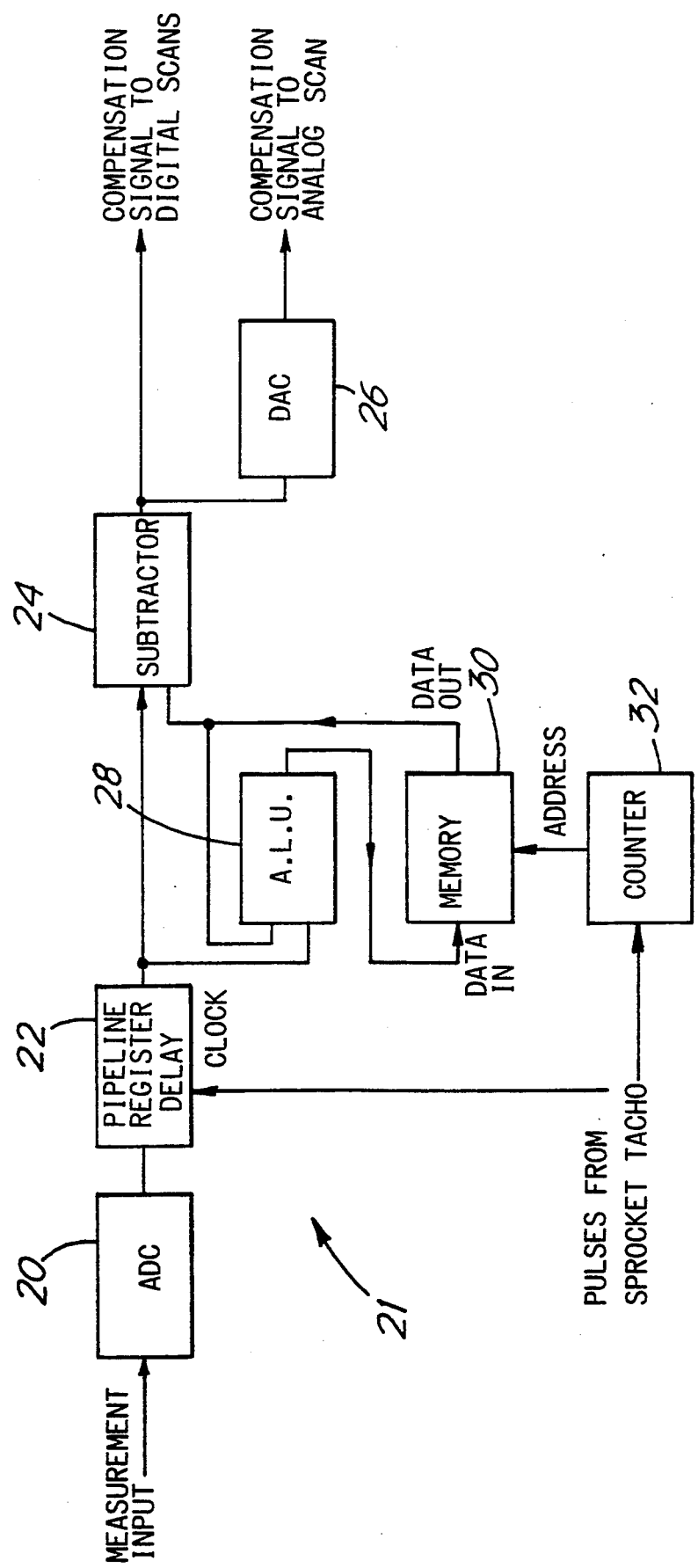

METHOD AND APPARATUS FOR COMPENSATING FOR FILM REGISTRATION WEAVE IN FILM SCANNING SYSTEMS

FIELD OF THE INVENTION

This invention relates to a method and apparatus for compensating for positional instability of film passing through a film gate in a telecine or film writer.

BACKGROUND OF THE INVENTION

The picture frames on cinematographic film are conventionally registered with the sprocket holes by register pins. A steady picture display is ensured in such systems as film projection equipment can display each frame using a similar registration mechanism. However, in telecine and film writers for example, the film conventionally moves through the film gate at a steady speed and thus register pins cannot be inserted.

In conventional telecine equipment, the cinematographic film is positioned in the film gate by pressing one edge against the guide skid as illustrated schematically in FIGS. 1 and 2. As the picture frames are located relative to the sprocket holes and not the film edge, a problem arises when the edge of the film is uneven and not accurately positioned relative to the sprocket holes. In such an instance, the frame with the picture image will wander according to the irregularities in the film edge.

The CRT beam scans the same area of the film gate for each frame. Thus, if the frame is slightly misplaced on the film, its actual position will not coincide exactly with the CRT scan. This will have the result that the displayed image will weave slightly from side-to-side. Because film manufacturers register picture frames with respect to sprocket holes, little care is used in maintaining the taughtness of the film edge, thereby increasing film weave.

It is desirable to minimize this film instability effect, and various methods for so doing have been proposed. For example, U.S. Pat. No. 4,104,680, teaches moving the CRT scan to compensate for the film motion and the error is measured by optical detection of the sprocket hole.

A disadvantage of such a system is that further errors may be caused by the presence of dirt or dust in the sprocket hole.

SUMMARY OF THE INVENTION

An object of the present invention is to provide a weave compensation system which does not suffer from the disadvantages of prior art systems.

Broadly, the invention develops a compensation signal based on variations in the distance between the sprocket holes and the film edge.

A system embodying the invention may have a number of advantages. Most notably, the problems incurred in optical sensing techniques caused by the presence of dust or dirt in the sprocket holes or damaged sprocket holes are overcome as the film is registered against the teeth of a sprocket wheel, this being analogous to the register pins in a conventional film projector, and the position of the film edge is measured at this point relative to the sprocket teeth. Preferably the distance is measured using a stylus positioned to contact the film edge.

Embodiments of the invention will now be described by way of example, and with reference to the accompanying drawings, in which:

BRIEF DESCRIPTION OF THE DRAWINGS

FIG. 5 is a block diagram of the compensation circuit including the delay unit shown in FIG. 4; and FIG. 6 is a block diagram of a further development of the compensation circuit of FIG. 5.

DESCRIPTION OF BEST MODE

Figure 2:
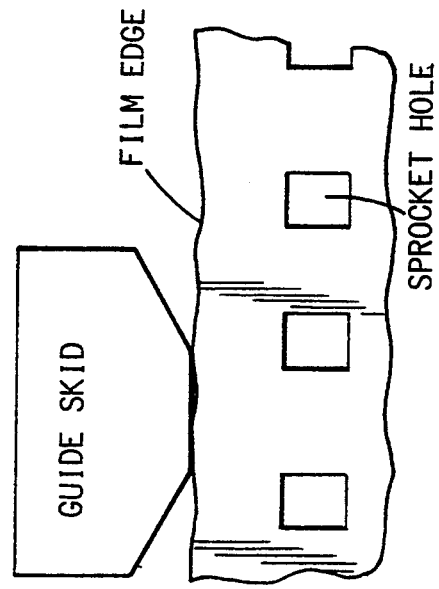
FIG. 2 is an enlarged view of a portion of the conventional guidance system of FIG. 1.
Figure 4:
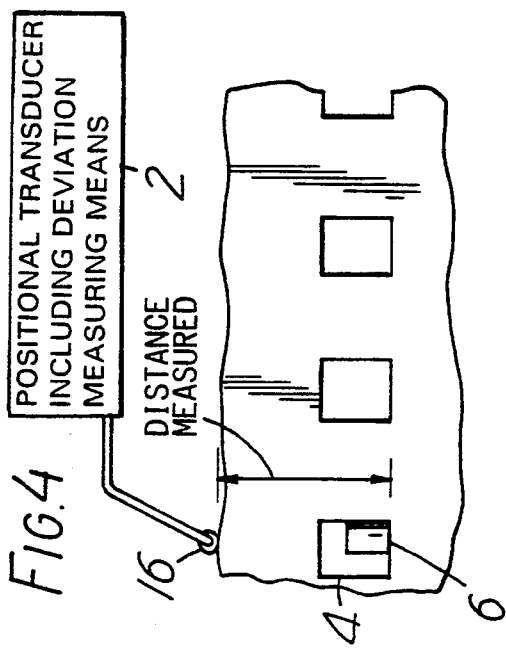
FIG. 4 is an enlarged view of a portion of the system of FIG. 3.
Figure 1:
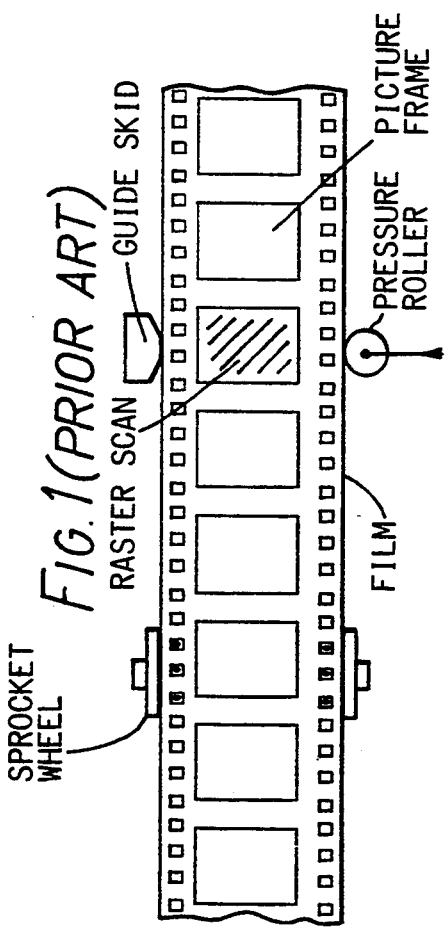
FIG. 1 is a conventional guidance system showing a film as it passes through a telecine film gate.
Figure 3:
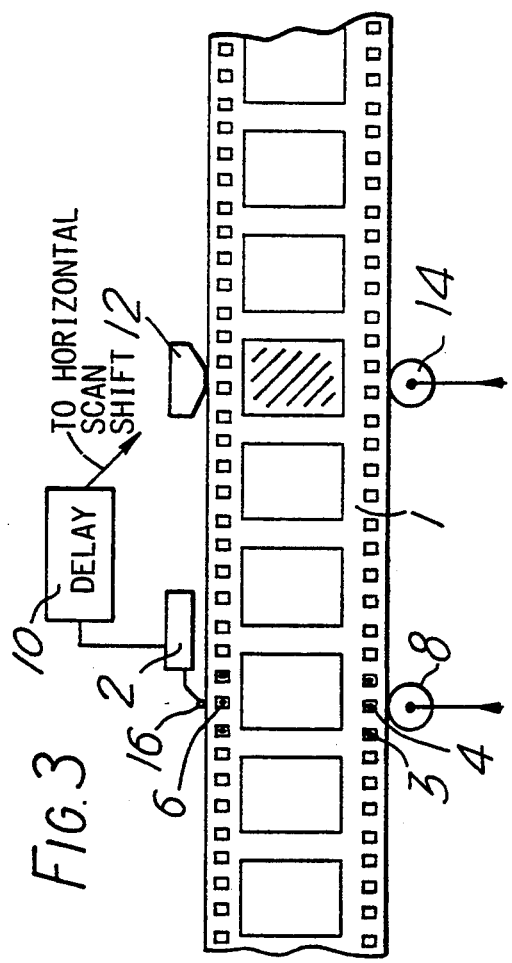
FIG. 3 is a schematic diagram of a guidance system embodying the invention.

The guidance system in FIGS. 3 and 4 shows film 1 passing over a sprocket wheel, the teeth 6 of which are engaged in the sprocket holes 3 of the film. A first pressure roller 8 ensures that the film is located pressing against the inside edge of the sprocket teeth 6 on the side of the film adjacent to a positional transducer 2. This may be seen from the enlarged view of the system shown in FIG. 4. A stylus 16 of the positional transducer device 2 bears on the film edge, and acts to measure the distance between the film edge and a first sprocket hole 4, and deviations therein for subsequent sprocket holes, to provide signals representative of the positional errors at the sprocket holes. The output of the positional transducer system 2 is coupled to a delay unit 10 shown in FIG. 3 which delays the signal corresponding to the error of a particular sprocket hole until that sprocket hole reaches the film gate, at which point it is applied to the horizontal scan shift as a compensation signal. The film passes through the film gate where it is scanned by the CRT raster. The film is maintained in position laterally at this point, by a second pressure roller 14 which presses the film edge against a guide skid 12.

The output from the positional transducer shown in FIGS. 3 and 4 is digitized by a/d converter 20 as shown in FIG. 5. The digitized signal is then applied to a pipeline register delay 22. This error signal is clocked through the pipeline register delay 22 by pulses obtained from the rotation of the sprocket wheel caused by movement of the film, so that the compensation signal corresponding to a particular sprocket hole is delayed and arrives at the output of the register at the same time that the sprocket hole arrives at the scanning area. The signal is then either applied directly to the scan shift to compensate a digital scanning system, or converted to an analog signal in a d/a converter 26 and applied to compensate for horizontal weave of the film image.

A second embodiment is shown in FIG. 6. This circuit derives a further compensation signal which compensates for cyclic errors caused by, for example, imperfections in the sprocket wheel such as the relative lateral displacement of the sprocket teeth.

A proportion of the output of the pipeline register delay 22 is added in an arithmetic logic unit 28 to a proportion of the value stored in a memory 30 corresponding to previous outputs relating to particular sprocket teeth. As the film runs, the ALU 28 will build up in the memory 30 stored values corresponding to the errors in the location of the teeth in the sprocket wheel. The memory locations are addressed by the counter 32 which is advanced or retarded by pulses from the sprocket tachometer according to the direction of film motion, each address corresponding to one sprocket tooth. The output from the memory 30 provides signals representative of the cyclic errors and is applied to a subtractor circuit 24, which subtracts the output of memory 30 from the compensation signal from the output of the pipeline register delay 22 to take account of the cyclic errors, thereby providing an overall compensation signal.

Various alternatives to the embodiments described are possible and will occur to those skilled in the art. For example, although the system embodying the invention has been described with reference to a flying spot telecine, it would be possible for the invention to be included in a flying spot film writer system. Also, the stored signals representative of the cyclic errors present may be precalibrated or automatically entered by taking the long term average of measurements for each tooth.

In some cases, it may be advantageous for the output of the pipeline register to be sampled at a faster rate than once per sprocket tooth as described. This may be achieved by providing more pulses from the sprocket tachometer.

The positional transducer may be a record player type stylus and a piezo-electric transducer may be mechanically modified to fit the telecine viewing gate.

We claim:

1. Apparatus for compensating for film instability in an image converter for converting images recorded on film to images represented by video signals, said image converter having flying spot scanner means for scanning with a flying spot said images recorded on film at a scanning location as the film moves past said scanning location, and scan generation means for generating a scan pattern for said flying spot, and said film having a plurality of sprocket holes and a film edge, said compensating apparatus comprising:

measuring means for measuring a distance between said film edge and a first of said plurality of sprocket holes at a position prior to said scanning location in the direction of movement of said film;

means for measuring deviations from said distance measured by said measuring means at said first sprocket hole and said distance measured by said measuring means at a second and subsequent sprocket holes;

means for deriving a compensation signal from said deviations measured by said deviation measuring means; and means for applying said compensation signal to said scan generation means of said flying spot scanner means.

2. Apparatus according to claim 1, wherein said distance measuring means is arranged to bear on said film edge.

3. Apparatus according to claim 2, wherein said distance measuring means comprises a positional transducer.

4. Apparatus according to claim 3, wherein said positional transducer comprises a stylus and a piezo-electric transducer.

5. Apparatus according to claim 1, wherein said plurality of sprocket holes have edges, the apparatus further comprising a sprocket wheel with a plurality of sprocket teeth, and a pressure roller for bearing on said film edge to urge said edge of a first of said plurality of said sprocket holes against said sprocket teeth.

6. Apparatus according to claim 1, wherein said means for applying said compensation signal comprises means for delaying application of said compensation signal to said scan generation means of said flying spot scanner, until a sprocket hole to which said compensation signal corresponds arrives at said scan generation means.

7. Apparatus according to claim 1, further comprising a sprocket wheel having a plurality of sprocket teeth, wherein said means for applying said compensation signal comprises means for deriving a cyclic error compensation signal to compensate for cyclic errors caused by relative lateral displacement of said sprocket holes on said sprocket teeth.

8. Apparatus according to claim 7, comprising means for subtracting said cyclic error compensation signal from said compensation signal to derive an overall compensation signal for application to said scan generation means of said flying spot scanner.

9. Apparatus according to claim 7, wherein said means for deriving said cyclic error compensation signal comprises memory means for storing signals indicative of said cyclic errors for a first and subsequent sprocket teeth, wherein said means for applying said compensation signal comprises means for subtracting stored cyclic error signals for successive sprocket teeth from said compensation signals derived for successive sprocket holes, and timing means for synchronizing the arrival of the stored cyclic error signals and said compensation signals at said subtracting means.

10. A method of compensating for film instability in an image converter for converting images recorded on film to images represented by video signals, said image converter having a flying spot scanner for scanning with a flying spot said images recorded on film at a scanning location as the film moves past said scanning location, and a scan generator for generating a scan pattern for said flying spot, and said film having a plurality of sprocket holes and a film edge, said method comprising the steps of:

a) measuring a distance between said film edge and a first of said plurality of sprocket holes at a position prior to said scanning location in the direction of movement of said film;

b) measuring said distance at said position for a second and subsequent sprocket holes;

c) measuring deviations from said distance measured at said first sprocket hole and at said second and subsequent sprocket holes;

d) deriving a compensation signal from said measured deviations; and e) applying said compensation signal to said scan generator of said flying spot scanner.

11. A method as recited in claim 10, further comprising the step of:

delaying the application of the compensation signal to the scan generator until the sprocket hole to which the compensation signal corresponds reaches the scanning location.

12. A method according to claim 10, wherein the plurality of sprocket holes engage with a plurality of sprocket teeth, the method further comprising the step of deriving a cyclic error compensation signal to compensate for cyclic errors caused by relative lateral displacement of the sprocket teeth.

13. An apparatus for compensating for film registration weave for use with a film scanner, the film scanner including a flying spot scanner for scanning at a scanning location images recorded on a film and a scan generator for generating a scan pattern for the flying spot scanner, the film having a plurality of sprocket holes and a film edge, said apparatus comprising:
   a) a distance determiner for determining a distance between each of said plurality of sprocket holes and said film edge;
   b) a deviation determiner for determining a deviation between the distance measured at a first sprocket hole and the distance measured at each of the plurality of sprocket holes following the first sprocket hole; and
   c) a compensation signal generator for generating a compensation signal based on the deviation and applying the compensation signal to the flying spot scanner.

14. An apparatus as recited in claim 13, wherein said distance determiner is disposed to contact the film edge.

15. An apparatus as recited in claim 13, wherein said distance determiner comprises a positional transducer.

16. An apparatus as recited in claim 15, wherein said positional transducer comprises a stylus and a piezo-electric member.

17. An apparatus as recited in claim 13, wherein said distance determiner is located upstream relative to the scanning location in a direction of film travel so that a distance is determined for a particular sprocket hole before the sprocket hole reaches the scanning location.

18. An apparatus as recited in claim 13, further comprising a delay for delaying the application of the compensation signal to the flying spot scanner.

19. An apparatus as recited in claim 13, further comprising a memory for storing the compensation signal until the sprocket hole to which the compensation signal corresponds reaches the scanning location.

20. An apparatus as recited in claim 13, wherein each of the plurality of sprocket holes have edges, the apparatus further comprising a sprocket wheel having a plurality of sprocket teeth and a pressure roller contacting said film edge for urging the sprocket hole edges against the sprocket teeth.

* * * * *